United States Patent

Vallejos

[11] 3,985,114
[45] Oct. 12, 1976

[54] APPARATUS FOR SHOCK MOUNTING OF PISTON RODS IN INTERNAL COMBUSTION ENGINES AND THE LIKE

[75] Inventor: Tony E. Vallejos, Signal Hill, Calif.
[73] Assignee: Alto Automotive, Inc., Deerfield, Ill.
[22] Filed: May 19, 1975
[21] Appl. No.: 578,805

[52] U.S. Cl. .............................. 123/197 R; 74/596; 92/84
[51] Int. Cl.² ........................................ F02B 75/32
[58] Field of Search .............. 123/197 AC, 197 AB, 123/197 R, 78; 74/50, 584, 581, 596; 92/84

[56] References Cited
UNITED STATES PATENTS
1,452,202  4/1923  Jory .............................. 123/197 AC
2,006,498  7/1935  Dasset ................................... 74/55

*Primary Examiner*—Samuel Scott
*Assistant Examiner*—F. D. Shoemaker
*Attorney, Agent, or Firm*—Garrettson Ellis

[57] ABSTRACT

An engine is disclosed having pistons in operative connection with a crankshaft. A bearing member, defining a curved periphery, is carried on the crankshaft for eccentric rotation thereabout in a direction transverse to the major axis of the crankshaft, with the periphery of the bearing member being positioned to be in power-transmitting, sliding relationship with a connection to the piston. The bearing member is adapted for transverse displacement by the piston rod relative to the crankshaft, while transmitting power to the crankshaft, to absorb any shock generated against the piston and the crankshaft, such as by "engine knock." The bearing member is also adapted for return to its pre-displacement position after absorbing the shock.

24 Claims, 14 Drawing Figures

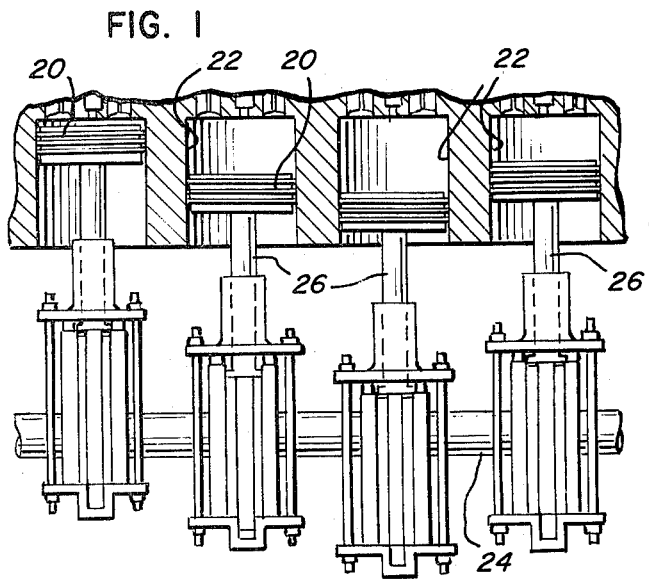
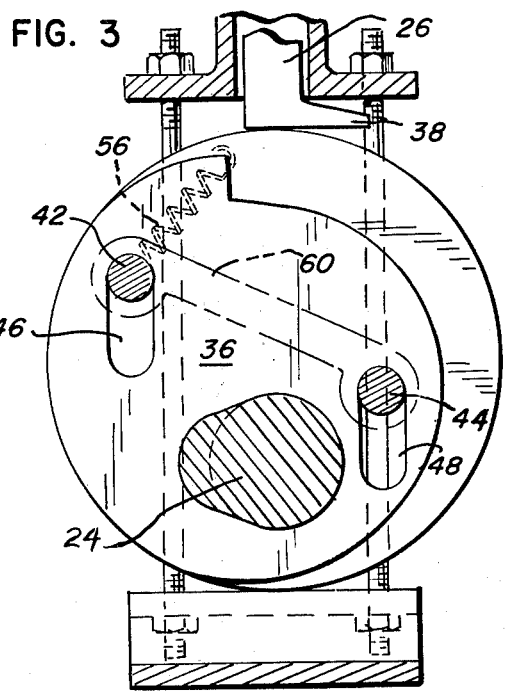
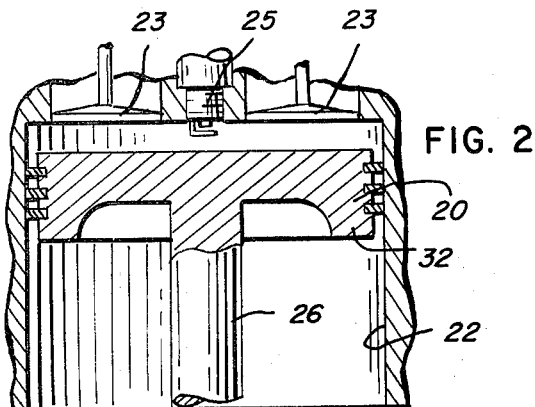
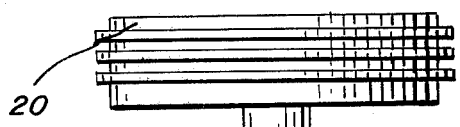
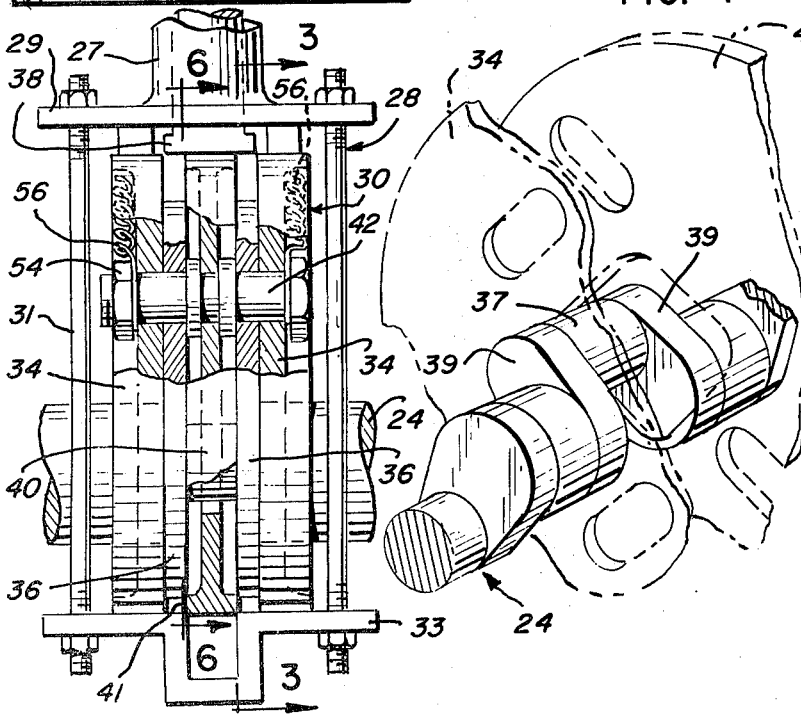

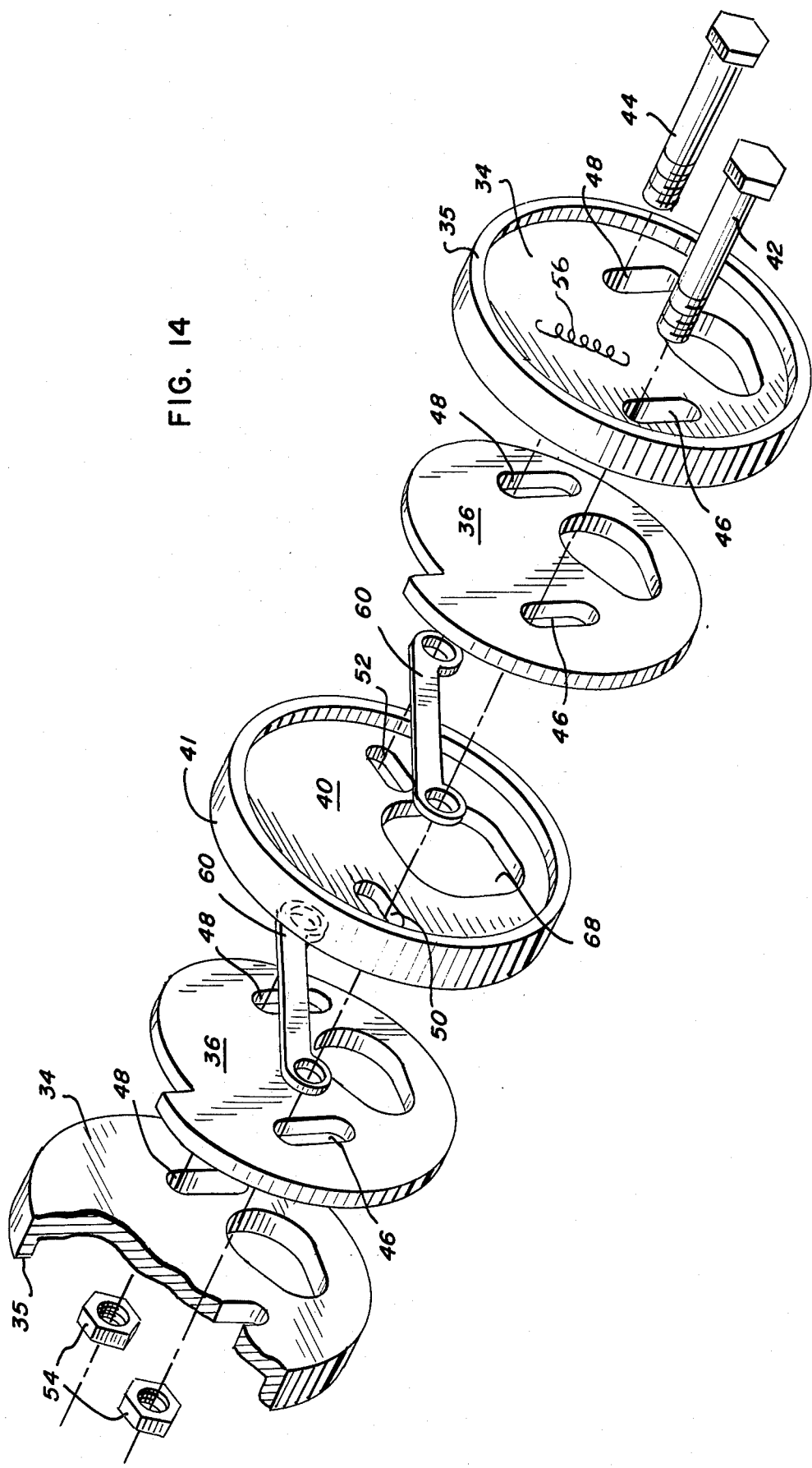

APPARATUS FOR SHOCK MOUNTING OF PISTON RODS IN INTERNAL COMBUSTION ENGINES AND THE LIKE

BACKGROUND OF THE INVENTION

One of the most significant engineering problems which must be overcome in the development of an internal combustion engine, such as a gasoline or diesel engine, is the suppression of engine "knock".

As is well known, knocking is generally caused when the crankshaft journal is aligned with the piston rod, so that the piston is essentially at its maximum position of compression in the cylinder, which is known as the "top dead center" position. Upon ignition, the compressed, vaporized fuel within the cylinder may fire too rapidly, rather than burn with a smooth combustion rate. This explosive combustion creates a shock wave which strikes the piston, placing tremendous stress upon the piston, the piston rod, and the crankshaft.

Because of this problem, pistons and piston rods must be designed to endure a level of shock which is not customarily encountered during normal operation of the engine. Also, because of this problem, lead fuel additives or high test gasoline are often required, which adds to the fuel expense. Furthermore, high test gasoline, although more expensive, actually carries less available energy per gram than the more violently burning low test gasoline.

Furthermore, because of the need to avoid the damaging effects of engine knock, the maximum compression in the cylinder must often be reduced, to avoid preignition. Also, at lower engine speeds the spark plugs are usually set to fire after the piston has passed the top dead center position, i.e. after the piston has begun its withdrawal from the cylinder. This is desirable from the point of view of avoiding damage from knocking, since any shock that is transmitted to the piston can then be transmitted to the rotating crankshaft. Such is not the case at the precise top dead center position or before in conventional piston-crankshaft arrangements, since at the top dead center position, force cannot be transmitted from the piston and piston rod into the crankshaft in the form of torque, because at that moment the crankshaft journal is aligned with the piston rod.

As a further technique of avoiding the undesirable effects of engine knock, the cylinders of the conventional internal combustion engine are designed to be smaller than they might otherwise desirably be, with large numbers of cylinders provided. Accordingly, the major United States auto manufacturers have provided their customers with six and eight cylinder engine automobiles, in which each cylinder has a displacement volume of, for example, 800 cubic centimeters.

Furthermore, as another means for reducing the undesirable effects of engine knock, engines are set to run rapidly at a high number of revolutions per minute, for example a typical cruising rate of 3,000 r.p.m.

Many of the above conventional and commercial engine characteristics are in themselves undesirable, but have been accepted by the industry in order to minimize the bad effects of engine knock, which can damage the piston and piston rods of an improperly designed engine. For example, if combustion in the cylinders could be safely initiated while the piston was in top dead center position, a substantial increase in the efficiency of the engine would result. In the present commercial designs, the amount of the travel of the piston from top dead center to the retracted position at which the spark plugs are fired is completely wasted, in terms of obtaining power from the engine.

Also, a greater efficiency can be obtained with a higher compression of the air-fuel mixture before firing.

Similarly, but for the problem of engine knock and lugging, an engine having a few large cylinders operating at a low number of revolutions per minute could be quite attractive. A large cylinder can be very powerful, and, especially when operating at a low r.p.m. rate, would have a distinct tendency to provide more complete burning of the exhaust gases, resulting in a lower hydrocarbon emission, even without the use of antipollution equipment. Oxides of nitrogen tend to be formed next to the cylinder wall, and complete burning can be inhibited there. A large cylinder has less wall surface area for its working volume. Thus, use of a larger cylinder will result in proportionately less undesirable exhaust components.

Because of the capability of the engine disclosed herein to operate at low rates (revolutions per minute), the usual problems of engine balance and lack of smoothness associated with engines having few cylinders can be greatly reduced.

Similarly, the fact that an engine operates at a lower number of revolutions per minute (r.p.m.) results in more complete burning and in a greater and more efficient utilization of the energy which is released, plus a reduced hydrocarbon emission, and longer engine life.

However, the full realization of the above advantages has not been achieved in the prior art because of the tremendously damaging effects of engine knock and the lack of efficient operation at lower r.p.m. rates. Previously, the avoidance of these two problems has required the designing of fast engines, having many small cylinders, in which the firing of the cylinders is set after top dead center position, and in which the maximum fuel-air mixture compression before firing has been restricted. The problems created by these solutions, such as high wear factors, high r.p.m. stress factors, higher cost, etc. have been deemed preferable to the problems they are designed to eliminate.

Numerous attempts are reported in the patent literature to dispense with the problem of engine knock; see, for example, the following U.S. patents: Anderson Pat. No. 2,134,995; Goodwin Pat. No. 1,752,379; Bugatti Pat. No. 2,151,835; Mallory Pat. No. 1,379,115; and Vriend Pat. No. 3,574,293. None of the structures of the above-cited patents appears to have come into significant commercial use, apparently because of their undesirable complexity in some instances, and in other cases because of their primary reliance upon springs, rubber bushings, and the like, which are generally incapable of providing reliable, long-term performance.

The invention of this applciation provides a simple, reliable apparatus for obtaining the above-described advantages by shock mounting an engine, cushioning it from the effects of shock caused by knocking, or "lugging", which can result from operation at undesirably low speed under too heavy a load or too high a gear ratio. Accordingly, the engine can be designed for greater efficiency, with less concern about the effects of knocking and lugging.

The apparatus of this invention can be expected to have a life span which corresponds to the rest of the engine, and yet is simple, self-contained, completely automatic, and requires structural modifications differing greatly only at the crankshaft and piston rod from that which is customary and conventional in the present internal combustion art.

As a further advantage, while the pistons of this engine are shock mounted during the combustion cycle in an engine to protect against engine knock and lugging, the shock mounting feature may be spontaneously deactivated during the piston compression cycle, so that the piston advances into the cylinder to a precisely predetermined point, unimpeded by any "play" in the piston rod or the like. Accordingly, a precise spacing of the piston in the cylinder can be achieved at top dead center to obtain the desired compression, but also, the desired advantages described above can be achieved.

Also, the immediate displacement of the piston upon detonation permitted by this invention can result in a quicker release of combustive pressures, resulting in a lower operating temperature.

DESCRIPTION OF THE INVENTION

In this invention, an improved engine having piston means reciprocable in a cylinder chamber is provided. A crankshaft, adapted for power conveyance to the wheels or other source of energy output is in power-transmitting relation with the piston means. Typically, piston rods are used to transmit power between the piston and the crankshaft.

In accordance with this invention, a bearing member, defining a curved periphery, is carried on the crankshaft for eccentric rotation thereabout in a direction transverse to the major axis of the crankshaft. The periphery of the bearing member is positioned to contact the piston rod in power-transmitting, sliding relationship. Means are also present to permit the displacement of the bearing member by the piston rod, relative to the crankshaft, while transmitting power to the crankshaft, to absorb shock generated in the cylinder chamber, typically by fuel detonation, preignition, or stresses imparted by lugging of the engine.

Typically, the bearing member is carried by an eccentrically mounted member, rigidly mounted on the crankshaft in transverse relation to it. The eccentrically mounted member includes a compression cam adapted to periodically engage the piston rod means as the crankshaft and eccentrically mounted member rotate, to cause the piston to reciprocate inwardly to reduce the volume of the cylinder combustion chamber when the compression cam engages the piston rod, but to permit the shock absorption function described above when the compression cam is spaced from the piston rod connection means, to permit the piston and connection means to displace the bearing member.

Typically, the piston rod connection means includes a cage member slidingly attached to a piston rod which is, in turn, connected to the piston. The sliding attachment permits relative axial motion between the cage member and the piston rod. The cage member encloses the eccentrically mounted member in a relationship permitting rotation of the eccentrically mounted member about the crankshaft, as the piston means and piston rod reciprocate in the cylinder chamber. Accordingly, the piston rod can be designed to move with straight reciprocating motion, avoiding the need for a wrist pin between the piston rod and the piston.

It is preferred for the displaceable bearing member to be displaced, during the shock absorption process, by the piston rod in a direction to move the center of mass of the bearing member radially inwardly with respect to the path of rotation of the bearing member about the rotating crankshaft. Accordingly, energy from the piston rod is expended in overcoming centrifugal force in the bearing member, and the bearing member spontaneously resumes its original position, absent energy input from the piston rod when the crankshaft rotates.

It is particularly desirable for the displaceable bearing member to be positioned between a pair of the eccentrically mounted members described above. Each of the eccentrically mounted members may carry a compression cam, and the pair of eccentrically mounted members and the bearing member are positioned within the cage described above to facilitate smooth and reliable transmission from the piston to the crankshaft.

As is described below, an arrangement of parallel first slots is preferably provided in each eccentrically mounted member, while a pair of corresponding second slots, in normal relation to the first slots, is provided in the displaceable bearing member, to permit bi-directional motion of the bearing member when connection members such as shafts are moveably secured through each pair of corresponding first and second slots.

In the drawings,

FIG. 1 is a schematic view of four pistons and cylinders connected to a crankshaft in accordance with the invention.

FIG. 2 is an enlarged elevational view, taken partly in longitudinal section, of a piston, reciprocable in a cylinder chamber, shown in top dead center position, showing in greater detail the power-transmitting connection between the piston and the crankshaft.

FIG. 3 is a simplified sectional view taken along line 3—3 of FIG. 2.

FIG. 4 is a detailed view of the crankshaft used herein, showing how various other parts are mounted on it.

FIG. 5 is an elevational view of a piston and cylinder chamber, a portion of the crankshaft, and the power-transmitting components of FIG. 1, shown in a different phase of operation.

FIG. 14 is an exploded, perspective view of an eccentric member assembly of this invention, with the crankshaft omitted.

Figure 6:
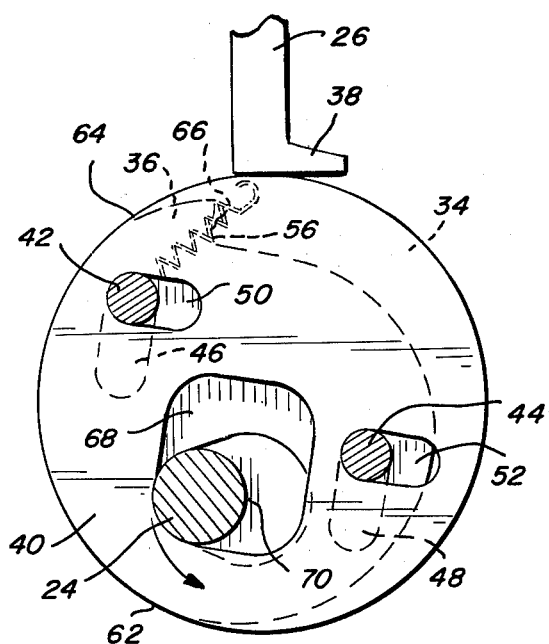
FIG. 6 is a simplified sectional view, taken along line 6—6 of FIG. 2, the structure shown being in a rotational position of a few degrees before the top dead center position of the piston, certain parts being omitted.

Referring to the drawings, FIG. 1 schematically shows part of a four cylinder engine made in accordance with this invention. Typically, the engine made may be an internal combustion engine, such as a diesel or a gasoline engine, of conventional construction except for the differences shown herein. It is also contemplated that this invention might be used with steam engines and the like.

A four-cycle gasoline engine is specifically disclosed in the drawings. Pistons 20 reciprocate in cylinder chambers 22. In the specific embodiment shown, the stroke length of each piston is contemplated to be about two inches, and the volume in the cylinder displaced by the piston could be about 200 cc.. However, it is also contemplated that cylinders 22 may have a displacement volume of 1 liter or more, with from 1 to 4 pistons and cylinders per engine being present (four being specifically shown). This latter type of engine can be very powerful, and may operate with a very low level of nitrogen oxide and hydrocarbon pollutants in its exhaust, and yet may be designed to be immune from the damaging effects of knocking and lugging. Such an engine can have a power output at least equal to conventional six and eight cylinder engines, while having fewer moving parts, fewer spark plugs, a simpler electrical system, and many other advantages achieved by the reduction in the number of cylinders.

The four piston and cylinder assemblies shown in FIG. 1 are operatively connected to a crankshaft 24 in such a manner that one piston 20 reaches the top dead center position in its cylinder 22 with each 90° of rotation of shaft 24.

As shown in FIG. 2, each cylinder 20 includes conventional valves 23 and a spark plug 25.

Each piston 20 is rigidly connected to a piston rod 26. As shown in FIGS. 2 and 5, each piston rod 26 is slidingly attached to a cage member 28. Piston rod 26 is slidably secured in tubular member 27 of cage member 28, which, in turn, carries front plate 29, to which struts 31, defining cage member 28, are bolted. Rear plate 33 is also bolted to struts 31, to complete cage member 28.

Cage member 28, in turn, encloses an eccentric member assembly 30 which is carried on crankshaft 24. Suitable sliding bearings are provided for sliding connection between cage member 28 and eccentric member assembly 30. Accordingly, as the crankshaft and eccentric member assembly rotate, cage member 28, piston rod 26, and piston 20 reciprocate back and forth in cylinder 22 along a longitudinal line without transverse rocking. This eliminates the need for a wrist pin to connect the piston and piston rod, and permits a size and weight reduction in the piston skirt 32, when compared with the presently used structures.

It should be noted that Dasset U.S. Pat. No. 2,006,498 discloses a cage-like structure surrounding an eccentrically-mounted member for an engine. However, that cage-like structure is directly, not slidingly, connected to a piston rod, as in this invention.

Referring now in further detail to FIGS. 2 through 4, and FIG. 14, in the particular embodiment shown, crankshaft 24 carries a pair of eccentrically mounted members 34, which are generally circular metal discs defining peripheral flanges 35, mounted in eccentric, off-center relation to the crankshaft as shown. In other embodiments, a single eccentric member 34 can be used. Eccentric members 34 are shown to be mounted on a shoulder 39 of crankshaft 24.

A compression cam 36 is attached by bolting, welding, or any other desired way to the facing surfaces of each eccentric member.

Bearing member 40 defining peripheral flanges 41, is positioned between compression cams 36, about crank portion 37 of crankshaft 24, but generally spaced therefrom. As shown in FIG. 6, the periphery of each cam 36 is normally in registry with a portion of the periphery of the bearing member 40 to which it is attached, but the remainder of the periphery of cam 36 lies within the periphery of bearing member 40. The purpose of cam 36, as described below, is to engage bearing shoe 38 of piston rod 26 during the compression and exhaust strokes of the engine cycle to provide, primarily on the compression stroke, the precisely desired amount of piston advance and resultant compression. However, on the power and suction strokes of the engine cycle, compression cam 36 is positioned to be not engaged with bearing shoe 38, to permit the shock-mounting function of the structure of this invention to take place as described herein.

Eccentric members 34, compression cams 36, and bearing member 40 are connected together by means of shafts or bolts 42, 44 in such a manner that bearing member 40 is capable of longitudinal, rearward displacement as shown in FIG. 5, when urged rearwardly by force transmitted to bearing member 40 through piston rod 26. Trough 47, defined in plate 33 of cage member 28, is proportioned to receive the displaced bearing member 40 in the manner shown in FIG. 5.

Eccentric members 34 and compression cams 36, when positioned with their associated piston 20 and piston rod 26 in top dead center position, define pairs of obliquely arranged, parallel first slots 46, 48 which are parallel in that position to the piston rod means. Bearing member 40 defines a pair of second slots 50, 52 in registry with, but in normal relation to, the first slots 46, 48 as shown, for example, in FIG. 7. As a connection means, shafts 42, 44 pass through respective pairs of the first and second slots, and are held in place by nut members 54, for retention together of the eccentric members 34, compression cams 36, and bearing member 40.

Alternatively, with appropriate modifications, the directions of first slots 46, 48 can be perpendicular to that shown, and second slots 50, 52 can be parallel to piston rod 26 at top dead center position.

Accordingly, bearing member 40 is capable of bidirectional motion, as shown in FIGS. 6 through 13, in response to force imparted against bearing member 40 by piston rod 26.

Bearing member 40 is mounted so that, upon displacement by piston rod 26, the center of mass of the bearing member is moved radially inwardly with respect to its path of rotation about rotating crankshaft 24. Accordingly, energy imparted from piston rod 24 is expended in overcoming centrifugal force in bearing member 40, as it is displaced, which at the same time imparts torque to the crankshaft. Also, bearing member 40 spontaneously resumes its original position in the absence of energy input from piston rod 26 when the crankshaft is rotating, due to the action of centrifugal force.

Springs 56 can be provided to connect shafts 42, 44 with eccentric member 34, to increase the resistance of bearing member 40 to displacement and to facilitate its return to its original position. The connections of springs 56 are conventional for example, by attachment of spring 56 into a holding slot in flange 35. Springs 56 may be positioned to exert a force vector on stretching which is at an angle to piston rod 26 at top dead center position, to provide torque to the crankshaft 24 upon displacement of bearing member 40 at the top dead center position, and even before. This can facilitate engine starting, or idling at very low speeds. While an extension spring is shown, compression springs, leaf springs, and other biasing means can also be used.

Alternatively, in fast engines, the amount of force necessary to overcome the centrifugal force tending to hold bearing member 40 in its normal, radially outward position may be so great that springs may be desirable to urge bearing member 40 toward its displaced position, rather than toward its radially outward position. Also, with proper balancing of the structures, it is contemplated that no springs at all may be required.

Retainer members 60 may be rigid metal strips connected between shafts 42, 44 for the purpose of preventing twisting of bearing member 40, relative to eccentric members 34, by holding the shafts in equidistant relation at all times, to prevent rotation of the bearing member during operation. They are positioned against bearing member 40 within flanges 41.

The typical operation of the apparatus of this invention is illustrated in FIGS. 6 through 13. In the sectional view of FIG. 6, one eccentrically mounted member 34 and its compression cam is not shown, for purposes of clear understanding of the movements of the bearing member, with respect to the eccentrically mounted members, and the operation of the compression cam. The not-shown eccentric member 34 and compression cam 36 function in a manner similar to that which is shown.

It can also be seen in FIG. 6 that the periphery of bearing member 40 is generally in registration with the periphery of eccentric member 34, when bearing 40 is in its normal, outward position.

In FIG. 6, crankshaft 24 is shown in the process of rotating counterclockwise as the engine operates. Compression cam 36 defines a leading edge 62, which is the area where the periphery of cam 36 first enters into registry with the periphery of bearing member 40, when in normal position as in FIG. 6. Compression cam 36 also defines a trailing edge 64, in which the periphery of the cam ceases to be in registry with the periphery of bearing member 40 in its normal position. The departure of edge 64 from the periphery of bearing member 40 is first gradual, and terminates in a step 66, to provide a clear space for sudden displacement of bearing member 40 by piston rod 26, upon the incidence of fuel detonation or the like in cylinder 22.

The gradual departure portion of edge 64 provides the possibility of automatically reducing the maximum compression at idling speeds, by allowing slight displacement of bearing member 40, while permitting a higher compression at high speeds, when bearing member 40 does not displace as easily due to high centrifugal force holding it in position.

Shafts 42, 44 are shown in FIG. 6 in cross section, passing through first slots 46, 48 defined in both eccentric member 34 and compression cam 36, and second slots 50, 52 of bearing member 40.

Bearing member 40 also defines an oversized aperture 68, through which crankshaft 24 passes, to provide space for the displacement of bearing member 40.

Figure 7:
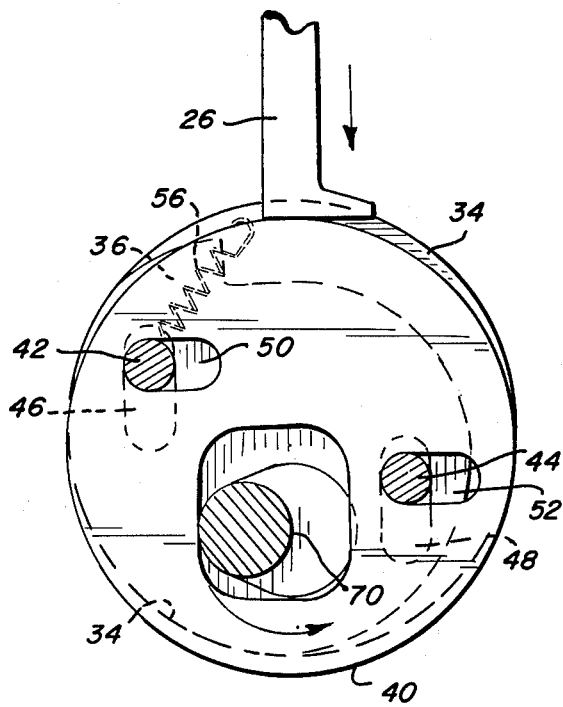
FIG. 7 is a view similar to FIG. 6, but showing the rotational position at top dead center position, an instant after combustion and detonation have occurred in the cylinder chamber.

As the structure of FIG. 6 rotates counterclockwise about center of rotation 70 into top dead center position as shown in FIG. 7, combustion takes place in the cylinder, driving piston rod 26 rearwardly. If a fuel detonation has taken place, the rearwardly driving force will be particularly vigorous, as the face of the piston is hit with a shock wave. This shock is transmitted along piston rod 26, but, instead of merely meeting resistant metal or a crankshaft in its top dead center position, as in the prior art, the shock wave is absorbed by the centripetal displacement of bearing member 40, as shown in FIG. 7.

In FIG. 7, it can be seen that shafts 42, 44 have been displaced in first slots 46, 48, and that the periphery of bearing member 40 is no longer in registry with the periphery of eccentric member 34.

Figure 8:
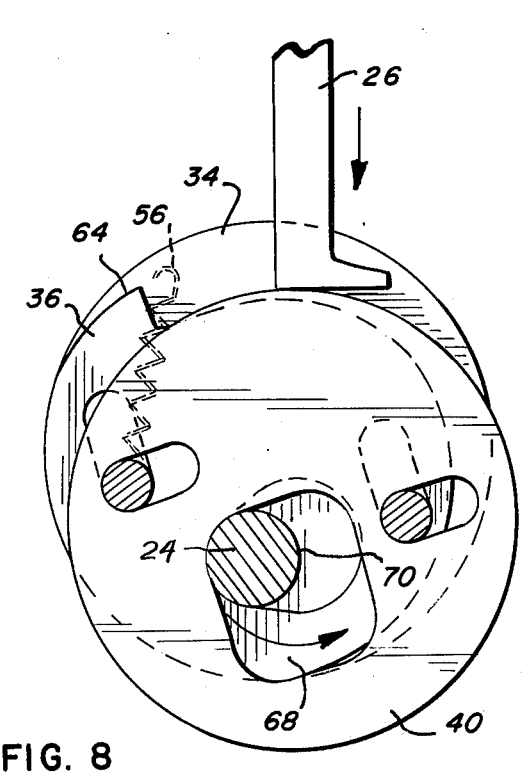
FIG. 8 is a view similar to FIG. 7, but taken after the crankshaft has rotated counterclockwise another few degrees.

FIG. 8 shows the same structure in a further position of counterclockwise rotation. Bearing member 40 is in a substantially displaced position, with bearing shoe 38 passing between eccentric members 34 into a position corresponding to that of FIG. 5. It can be seen that compression cam 36 does not interfere with this displacement, because its trailing edge 64 has moved out of the way. Hence, cam 36 is not in engaged relation with bearing shoe 38 in the particular rotational position shown in FIGS. 5 and 8.

Figure 9:
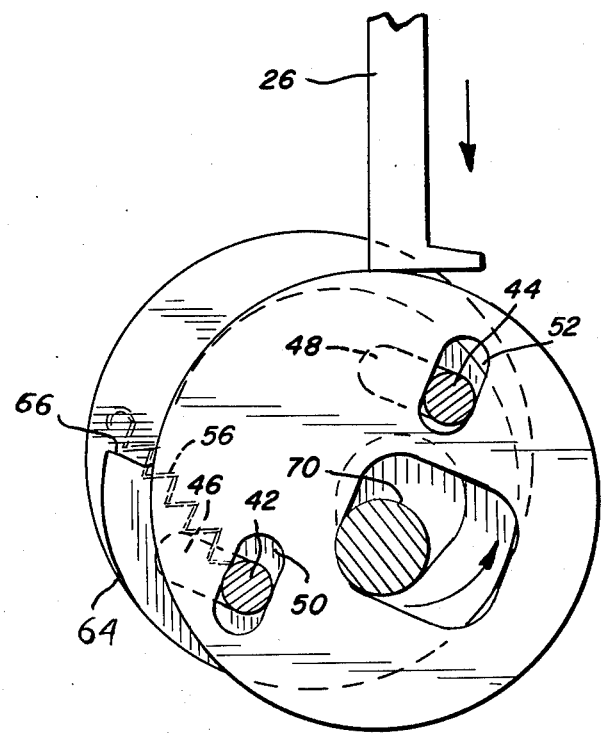
FIG. 9 is a view similar to FIG. 8, showing the position after further counterclockwise rotation.

FIG. 9 illustrates the functioning of this device after further rotation. Shafts 42, 44, having been previously fully displaced in the first slots 46, 48, have begun to displace in the second slots 50, 52 of the bearing member 40, to permit further displacement.

Figure 10:
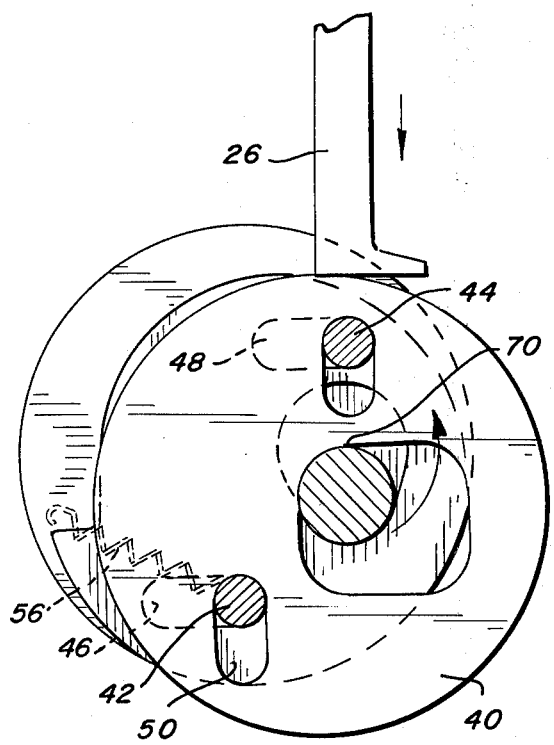
FIG. 10 is a view of the structure of FIG 7 after the structure shown has further rotated into a position which is 90° in the counterclockwise direction from the position shown in FIG. 7.

In the further stage of counterclockwise rotation shown in FIG. 10, shafts 42, 44 have completely displaced to the other ends of second slots 50, 52.

Figure 11:
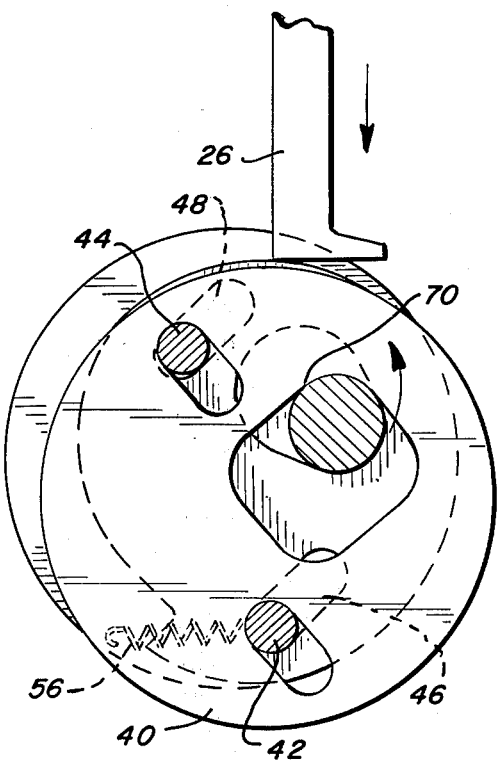
FIG. 11 is a view similar to FIG. 10, showing the position after about an additional 45° of counterclockwise rotation.

Upon further counterclockwise rotation as shown in FIG. 11, shafts 42, 44 displace again in the first slots 46, 48 as shown, thus maintaining the displacement of bearing member 40.

Figure 12:
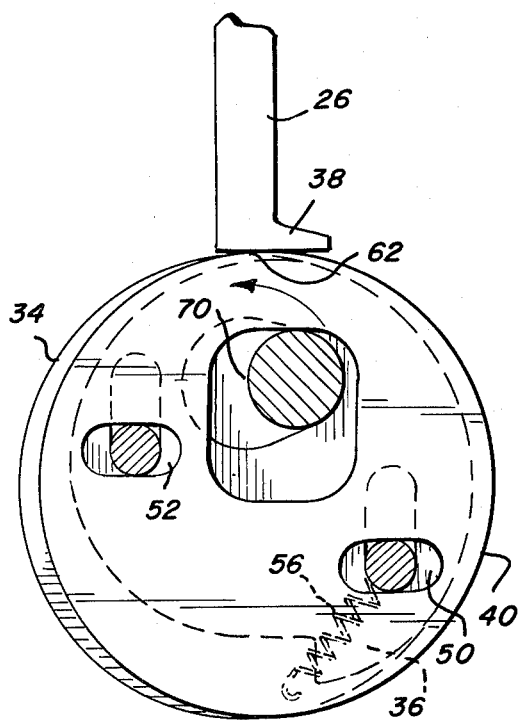
FIG. 12 is a view similar to FIG. 11, but showing the position after yet another 45° of counterclockwise rotation, with the associated piston in bottom dead center position, i.e. the position of maximum withdrawal from the cylinder chamber.
Figure 13:
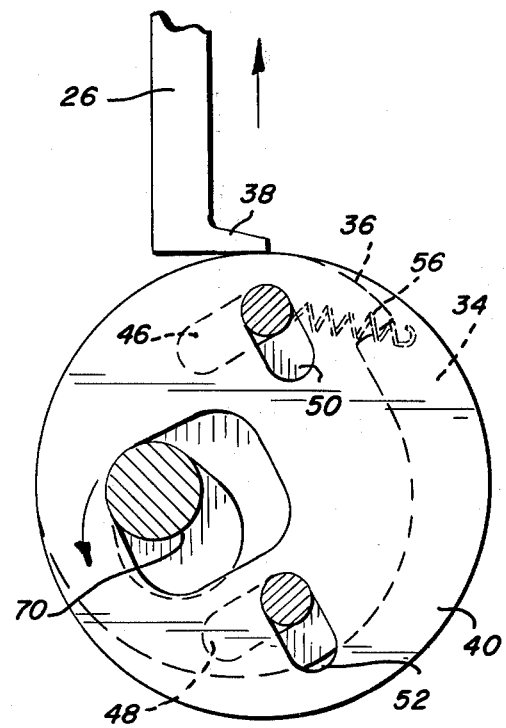
FIG. 13 is a view similar to FIG. 12, but showing the position after additional counterclockwise rotation.

FIG. 12 illustrates the bottom dead center position of the assembly of the invention, in which the associated piston 20 is in its most retracted position, relative to its cylinder 22. At approximately this rotational position, the leading edge 62 of compression cam 36 engages bearing shoe 38 of the piston rod so that, upon further counterclockwise rotation, piston 20 and piston rod 26 are forced again into cylinder 22, as eccentric members 34 and compression cam 36 rotate upwardly. This is also illustrated in FIG. 13, which shows a rotational position a few degrees short of the rotational position of FIG. 6. FIG. 13 shows that bearing member 40 has once again assumed its normal, non-displaced position.

Thereafter, the cycle illustrated by FIGS. 6 through 13 is repeated over and over again as long as the engine operates.

However, in the absence of fuel mixture detonation, engine lugging, or the like, the engine disclosed herein may operate without significant displacement of bearing member 40. In this instance, the periphery of bearing member 40 remains in registry with the periphery of eccentric members 34, the force from pistons 26 being transmitted to crankshaft 24 without any such displacement. Such force is, in that instance, insufficient to overcome the centrifugal force tending to hold bearing member 40 in its radially outward position of registry with eccentric members 34. Particularly at high speeds, it is to be expected that little or no displacement of bearing member 40 will take place during the operation of the engine.

Also, the amount of displacement of bearing 40 during an engine cycle may vary from the essentially complete amount of displacement shown in the drawings, through any amount of lesser displacement, to no displacement at all, depending upon the operating conditions of the engine.

While the ignition of the fuel mixture is shown in the illustrated embodiment to take place at the top dead center position, it is also contemplated that the firing spark can be advanced to a position slightly before the top dead center position, as long as step 66 has rotated sufficiently to clear bearing shoe 38 by the time that force begins to be transmitted to significant degree through piston rod 26. Accordingly, the engine of this application can utilize its entire stroke length for creating torque in the crankshaft, for improved efficiency of operation.

It can also be seen that the transmission, as well as the crankshaft, may be subjected to less stress due to knocking and lugging. Accordingly, the number of gears, and the weight of the drive shaft and universal joint, as well as other parts of the drive train, may be reduced.

It should also be noted that eccentric member assembly 30 is desirably positioned in the crankcase, so that it can be constantly lubricated with oil during operation.

Desirably, the engine of this invention can be made to cruise at a low engine velocity such as 2,000 r.p.m., for reduced engine wear. It can desirably operate at a compression ratio of about 14 to 1 without fear of damage due to detonation, to provide significantly increased horsepower over the similarly-sized conventional engines of the prior art. Furthermore, the engine of this invention can utilize more energetic, lower octane gas for efficient, economical gas utilization. Lead and other anti-knock additives may also be unnecessary, reducing to zero the emission of these undesirable substances in the exhaust.

The above has been offered for illustrative purposes only, and is not for the purpose of limiting the invention of this application, which is as disclosed in the claims below.

That which is claimed is:

1. In an engine having piston means reciprocable in cylinder chamber means; a crankshaft adapted for power-conveying rotation, and power-transmitting connection means between said piston means and the crankshaft, the improvement comprising:

a bearing member, defining a curved periphery, carried on said crankshaft for eccentric rotation thereabout as the crankshaft rotates, the periphery of said bearing member being positioned to contact said connection means in power-transmitting, sliding relationship, and means permitting displacement of said bearing member by said connection means relative to said crankshaft, to absorb shock generated in the chamber means, said bearing member being adapted for return to its pre-displacement position after absorbing of said shock.

2. The engine of claim 1 in which said bearing member is carried by an eccentrically-mounted member mounted on said crankshaft in transverse relation thereto, said eccentrically mounted member carrying a compression cam adapted to periodically engage said connection means as the crankshaft and eccentrically mounted member rotate, to cause said piston to reciprocate inwardly, to reduce the volume of said cylinder chamber, said cam being also adapted to be periodically spaced from said connection means, to permit said piston and connection means to displace said bearing member.

3. The engine of claim 2 in which said connection means comprises a cage member slidingly attached to piston rod means, to permit relative axial motion between said cage member and said piston rod means, said cage member enclosing said eccentrically-mounted member in a relationship permitting rotation of said eccentrically mounted member about said crankshaft as said piston means and piston rod reciprocate in the cylinder chamber, whereby said piston rod means moves with longitudinal reciprocating motion.

4. The engine of claim 3 in which said displaceable bearing member is displaced by said piston rod in a direction to move the center of mass of said bearing member radially inwardly with respect to the path of rotation of said bearing member about the rotating crankshaft, whereby energy from said piston rod means is expended in overcoming centrifugal force in said bearing member, and said bearing member spontaneously resumes its original position in the absence of energy input from said piston rod means.

5. The engine of claim 4 in which said displaceable bearing member is positioned between a pair of said eccentrically-mounted members, each carrying a said compression cam, said pair of members and bearing member being positioned within said cage member.

6. The engine of claim 5 in which each said eccentrically-mounted member, when positioned with said piston means and piston rod means in top dead center position, defines a pair of obliquely arranged parallel first slots, said slots being parallel to said piston rod means, and including connection means, moveable in said first slots and adapted for moveable connection with said displaceable bearing member.

7. The engine of claim 6 in which said connection means are moveably secured in a pair of corresponding second slots defined in said displacement bearing member, said corresponding second slots being in normal relation to said first slots, to permit bi-directional motion of said bearing member.

8. The engine of claim 7 in which said connection means are shafts extending through and secured in each corresponding first and second slot, and in which rigid spacing means connect said shafts together to hold said shafts a constant distance apart.

9. The engine of claim 8 in which each said shaft passes through corresponding first slots in the pair of eccentrically-mounted members between which the bearing member is positioned.

10. The engine of claim 9 in which each said compression cam has a leading edge, in terms of the normal direction of rotation of said eccentrically-mounted members, said leading edge being positioned to engage said piston rod means when said piston means and piston rod means are essentially at bottom dead center position.

11. The engine of claim 10 in which each said compression cam has a trailing edge, said trailing edge being positioned, as said eccentrically-mounted members rotate, to terminate contact between said compression cam and said piston rod means prior to reaching top dead center position.

12. The engine of claim 11 in which said piston rod means carries a bearing shoe on one end thereof for said sliding contact with said displaceable bearing member and said compression cams.

13. The engine of claim 12 in which the displacement volume of each cylindrical combustion chamber is at least one liter.

14. The engine of claim 13 which has from one to four pistons and cylinders as said piston means and cylinder chamber means.

15. The engine of claim 12 in which a spring member urges said bearing member into its radially outwardmost sliding position, said spring member being positioned to exert torque on said crankshaft when said bearing member is displaced in top dead center position, to cause said crankshaft to rotate.

16. The engine of claim 12 in which said piston means is rigidly connected to the piston rod means.

17. For use in an engine, a bearing member, defining a curved periphery and adapted for carrying on an engine crankshaft for eccentric rotation thereabout as the crankshaft rotates, the periphery of the bearing member being adapted for power-transmitting contact with piston rod means of an engine, said bearing member being also adapted for displacement relative to said crankshaft while transmitting said power to the crankshaft, to absorb shock transmitted by said piston rod means, said bearing member also adapted for return to its predisplacement position after absorbing of said shock.

18. The bearing member of claim 17 in which said bearing member is carried by a member adapted for eccentric mounting on said crankshaft in transverse relation thereto, said eccentrically mountable member including a piston rod compression cam having a periphery, part of said periphery being in registration with part of the periphery of said bearing member, to be in power-transmitting relationship with said piston rod, to intermittently cause the piston rod to reciprocate inwardly from compression, said cam also being proportioned and positioned to be out of registry with another part of the periphery of said bearing member, whereby said compression cam is periodically out of power-transmitting relationship with said piston rod means, to permit force from said piston rod means to displace said bearing member.

19. The bearing member of claim 18 in which said eccentrically mountable member and said bearing member are enclosed in a cage member, said cage member being carried by said piston rod means in axially slidable relation thereto, to permit relative motion of said piston rod means and said cage member for intermittent displacement of the bearing member by the piston rod means.

20. In an engine having piston means reciprocable in cylinder chamber means: a crankshaft adapted for power-conveying rotation, and power-transmitting connection means between said piston means and the crankshaft, the improvement comprising: an eccentrically mounted member mounted on said crankshaft in transverse relation thereto; a bearing member, defining a curved periphery, carried by said eccentrically mounted member on said crankshaft for eccentric rotation thereabout as the crankshaft rotates, the periphery of said bearing member being positioned to contact said connection means in power-transmitting, sliding relationship, and means permitting displacement of said bearing member by said connection means relative to said crankshaft, while transmitting said power to the crankshaft, to absorb energy generated in the cylinder chamber means, said bearing member being adapted for return to its pre-displacement position after absorbing of said shock, said power-transmitting connection means comprising a cage member slidingly attached to piston rod means, to permit relative axial motion between the cage member and said piston rod means, said cage member enclosing said eccentrically mounted member in a relationship permitting rotation of said eccentrically mounted member about said crankshaft as said piston means and piston rod means reciprocate in the cylinder chamber, whereby said piston rod means moves with longitudinal reciprocating motion.

21. The engine of claim 20 in which said displaceable bearing member is displaced by said piston rod means in a direction to move the center of mass of said bearing member radially inwardly with respect to the path of rotation of said bearing member about the rotating crankshaft, whereby energy from said piston rod means is expended in overcoming centrifugal force in said bearing member, and said bearing member spontaneously resumes its original position in the absence of excess energy input from said piston rod means when said crankshaft rotates.

22. In an engine having piston means reciprocable in cylinder chamber means: a crankshaft adapted for power-conveying rotation, and power-transmitting connection means between said piston means and the crankshaft, the improvement comprising: an eccentrically mounted member mounted on said crankshaft in transverse relation thereto; a bearing member, defining a curved periphery, carried by said eccentrically mounted member on said crankshaft for eccentric rotation thereabout as the crankshaft rotates, the periphery of said bearing member being positioned to contact said power-transmitting connection means in power-transmitting, sliding relationship; and means permitting displacement of said bearing member by said connection means relative to said crankshaft, while transmitting said power to the crankshaft, to absorb shock generated in the cylinder chamber means, said bearing member being adapted for return to its pre-displacement position after absorbing of said shock, said bearing member being displaceable by said connection means in a direction to move the center of mass of said bearing member radially inwardly with respect to the path of rotation of said bearing member about the rotating crankshaft, whereby said shock generated in the cylinder chamber means is dissipated in overcoming centrifugal force in said bearing member, and said bearing member spontaneously resumes its original position in the absence of said shock as said crankshaft rotates.

23. The engine of claim 15 in which the trailing edge of said compression cam defines a gradual departure portion in which the spacing between the periphery of said compression cam and the periphery of said bearing member gradually increases, to automatically permit the reduction of maximum compression at idling speeds, and said compression cam also includes a step portion in which the distance between the periphery of said bearing member and said compression cam, in normal position, increases sharply, to permit the substantial displacement of said bearing member.

24. In an engine having piston means reciprocable in cylinder chamber means; a crankshaft adapted for power conveying rotation, and power-transmitting connection means between said piston means on the crankshaft, the improvement comprising: a bearing member defining a curved periphery, carried on said crankshaft for eccentric rotation thereabout as the crankshaft rotates, the periphery of said bearing member being positioned to contact said connection means in power-transmitting, sliding relationship, and means permitting displacement of said bearing member by said connection means relative to said crankshaft, to absorb shock generated in the chamber means, said bearing means being adapted for return to its pre-displacement position after absorbing of said shock, said bearing member being carried by an eccentrically-mounted member mounted on said crankshaft in transverse relation thereto, said eccentrically-mounted member carrying a compression cam adapted to periodically engage said connection means as the crankshaft and eccentrically-mounted member rotate, to cause said piston to reciprocate inwardly to reduce the volume of said cylinder chamber, said cam being also adapted to be periodically spaced from said connection means, to permit said piston and connection means to displace said bearing member, said compression cam having a trailing edge, said trailing edge being positioned, as said eccentrically mounted member rotates, to terminate contact between said compression cam and the connection means to achieve said periodically spaced relationship, said trailing edge further defining a gradual departure portion in which the spacing between the periphery of said compression cam and the periphery of said bearing member, in said pre-displacement position, gradually increases, said portion being positioned to automatically permit the reduction of maximum piston compression at idling speeds, the periphery of said compression cam also including a step portion, in which the distance between the periphery of said bearing member and said compression cam, in said predisplacement position, increases sharply, to permit the substantial displacement of said bearing member.

\* \* \* \* \*